US005259906A

United States Patent [19]

Poplawski et al.

[11] Patent Number: 5,259,906

[45] Date of Patent: Nov. 9, 1993

[54] METHOD OF MAKING AND USING A COMBINED SHIPPING LABEL PRODUCT INFORMATION DEVICE

[75] Inventors: John R. Poplawski, Darien, Ill.; Gregory J. Barmore, Plano, Tex.; Thomas E. Dash, Aurora, Ill.

[73] Assignee: Wallace Computer Services, Inc., Hillside, Ill.

[21] Appl. No.: 871,177

[22] Filed: Apr. 20, 1992

[51] Int. Cl.$^{5}$ .................. B32B 1/00

[52] U.S. Cl. .................. 156/252; 156/251; 156/268; 156/271; 156/247

[58] Field of Search .................. 156/277, 247, 268, 271, 156/252, 251

[56] References Cited

U.S. PATENT DOCUMENTS

| | | | |
|---|---|---|---|
| 2,311,946 | 2/1943 | Kroner | 40/530 |
| 2,639,254 | 5/1953 | Smith | 156/108 |
| 2,804,202 | 8/1957 | Davis | 206/456 |
| 3,159,521 | 12/1960 | Pechman | 156/DIG. 33 |
| 3,271,218 | 4/1966 | Ott et al. | 40/152 |
| 4,012,268 | 3/1977 | Johnson | 156/204 |
| 4,359,358 | 11/1982 | Hattemer | 156/277 |
| 4,491,495 | 1/1985 | Muscoplat | 156/277 |
| 4,514,248 | 4/1985 | Cummings | 156/277 |
| 4,528,054 | 7/1985 | Stahl et al. | 156/277 |
| 4,661,189 | 4/1987 | Voy et al. | 156/277 |
| 4,721,628 | 1/1988 | Pieper | 156/277 |
| 4,787,950 | 11/1988 | Meloni et al. | 156/277 |
| 4,824,503 | 4/1989 | Wilen | 156/277 |
| 5,021,273 | 6/1991 | Kobayashi | 101/92 |

*Primary Examiner*—David A. Simmons
*Assistant Examiner*—Merrik Dixon
*Attorney, Agent, or Firm*—Tilton, Fallon, Lungmus & Chestnut

[57] ABSTRACT

A method of making and using a combined shipping label and product information device which includes the steps of providing a relatively elongated foldable sheet having a pair of sides and leading and trailing ends and equipped with a plurality of connected panels, and having a release liner adhesively secured thereto, printing addressee information on one panel and product information on another panel, applying adhesive in a longitudinally extending pattern adjacent each of the sides and also in a transversely extending pattern while folding the sheet between adjacent panels to position the product information on a hidden inner surface and the addressee identification information on an outer surface, perforating the folded sheet along a longitudinally extending line adjacent each of the sides inboard of the longitudinally extending adhesive pattern, removing the release liner and adhesively securing the device to a carton, shipping the carton to the addressee and upon carton receipt tearing the device along the longitudinally extending lines to expose the product information.

9 Claims, 5 Drawing Sheets

Fig. 1 PRIOR ART
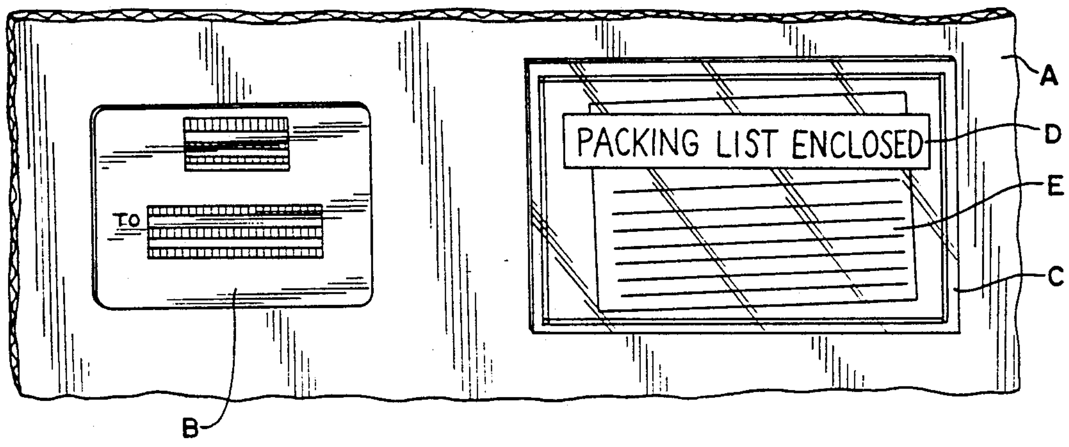
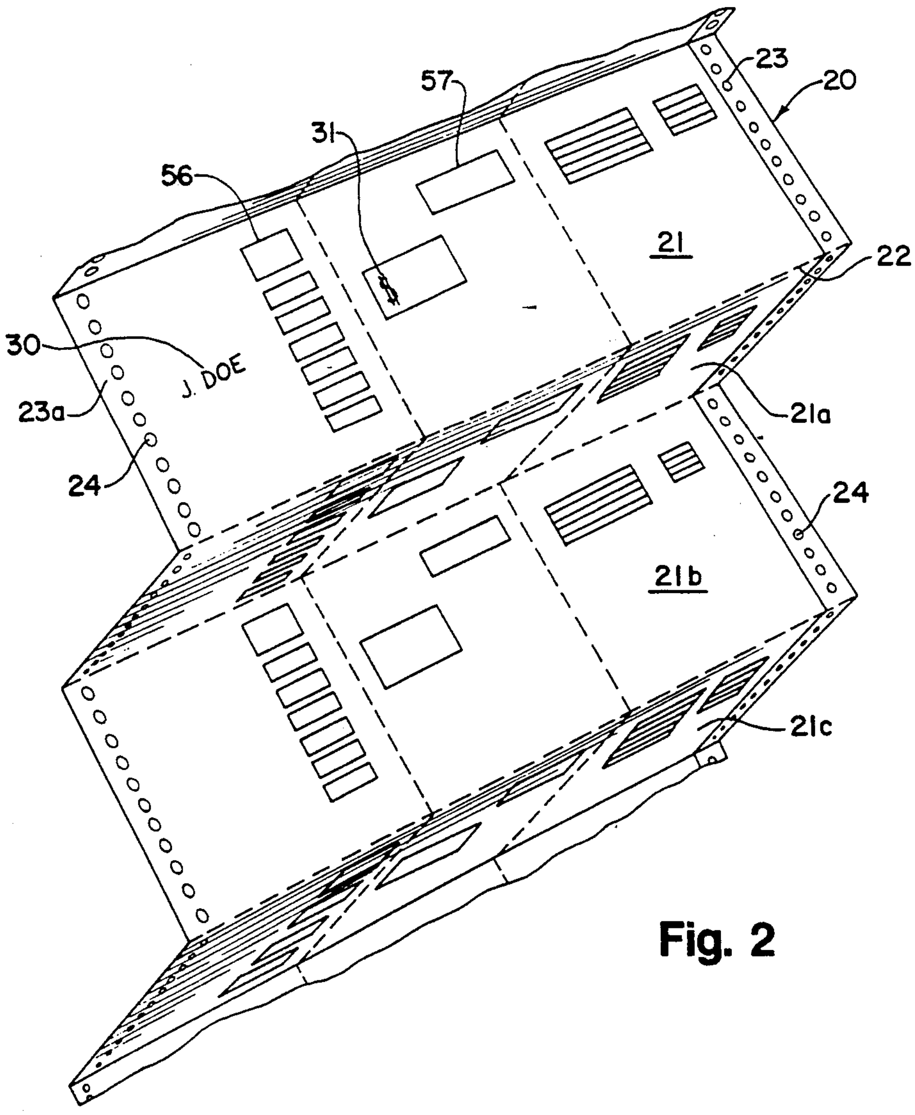
Fig. 2

Fig. 7A
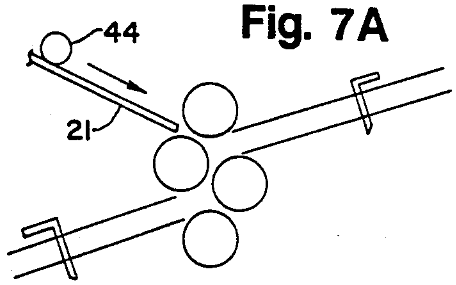
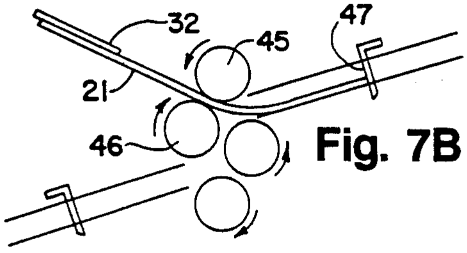
Fig. 7B
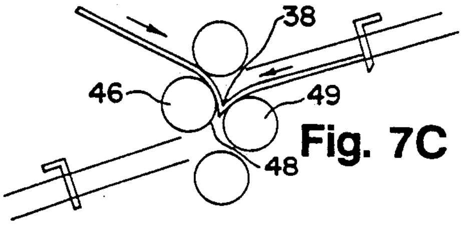
Fig. 7C
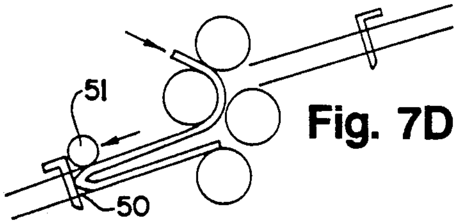
Fig. 7D
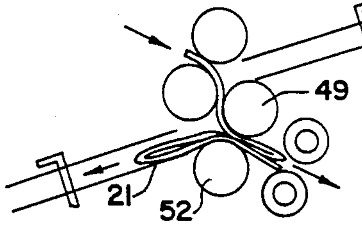
Fig. 7E
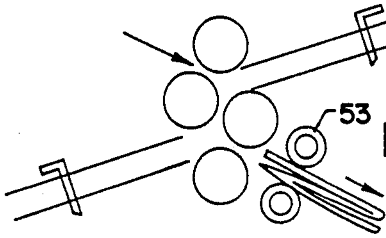
Fig. 7F
Fig. 8
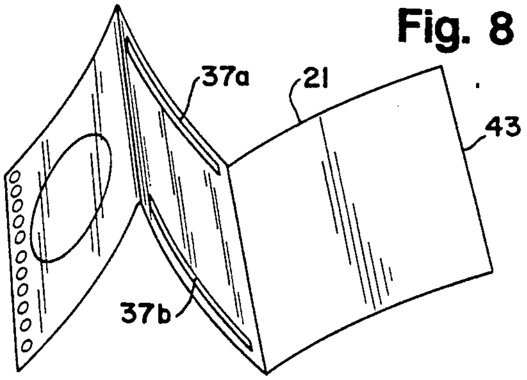
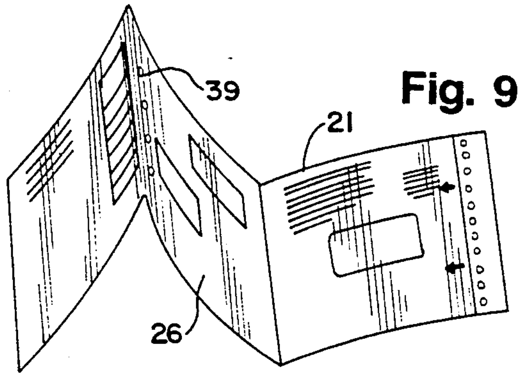
Fig. 9
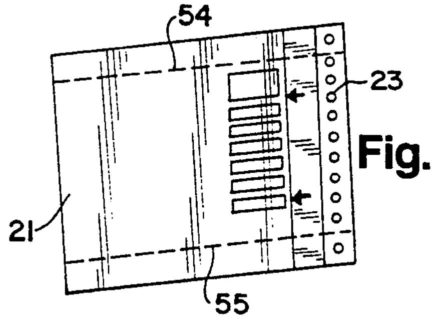
Fig. 10
Fig. 11
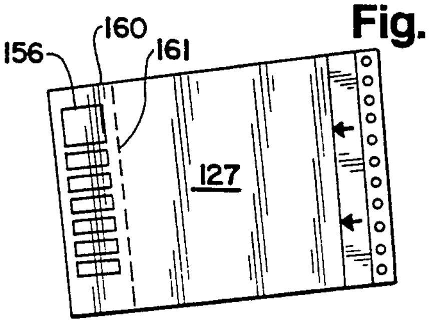

Fig. 12
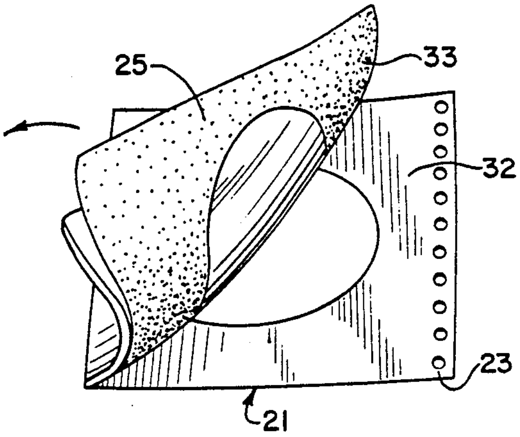
Fig. 13
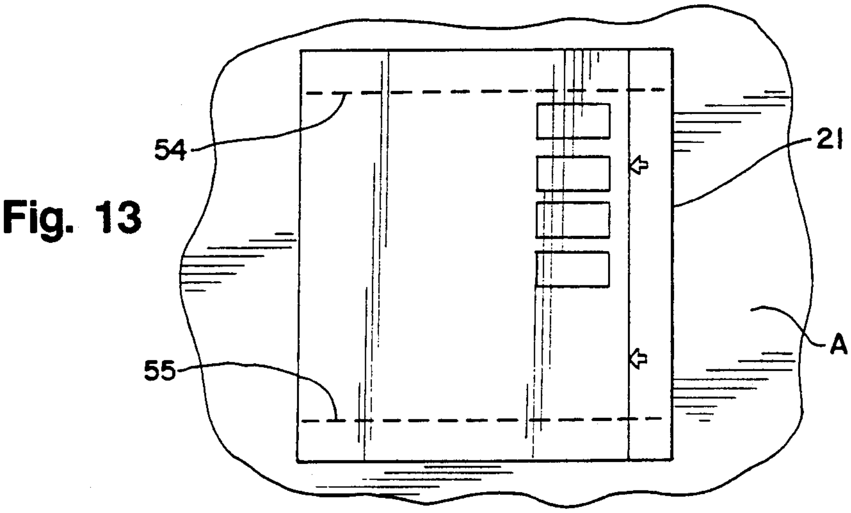
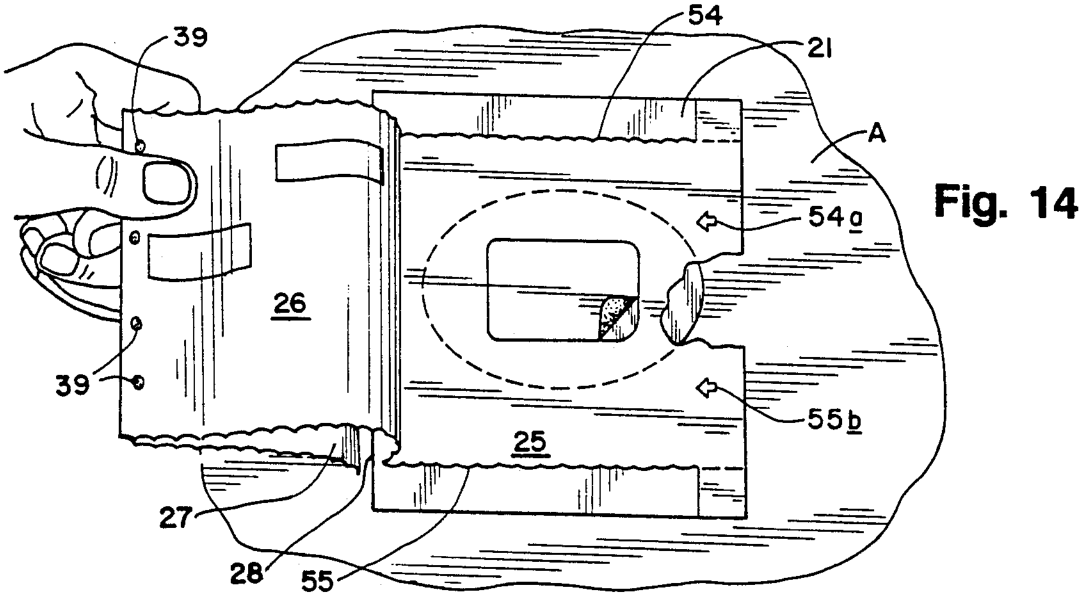
Fig. 14

Fig. 15
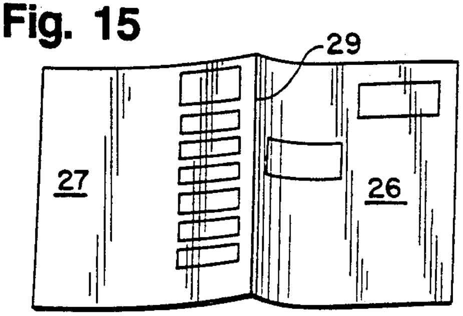
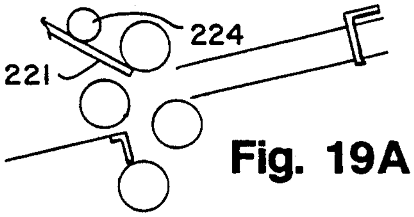
Fig. 19A
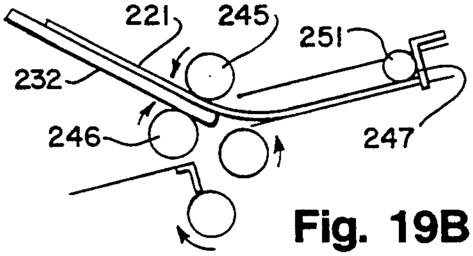
Fig. 19B
Fig. 16
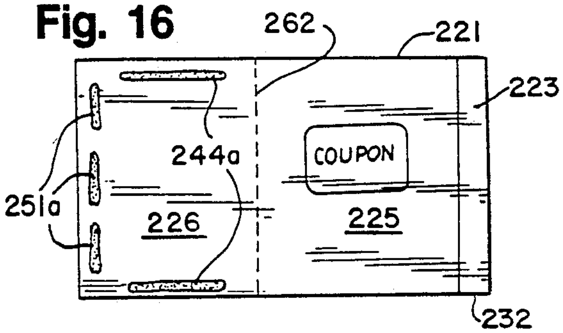
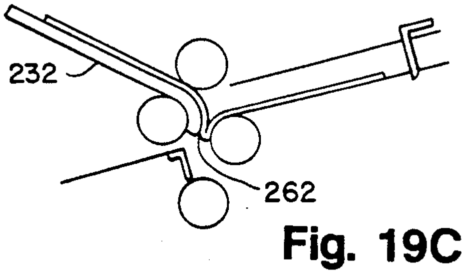
Fig. 19C
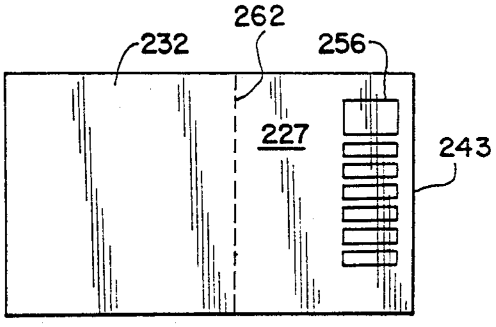
Fig. 17
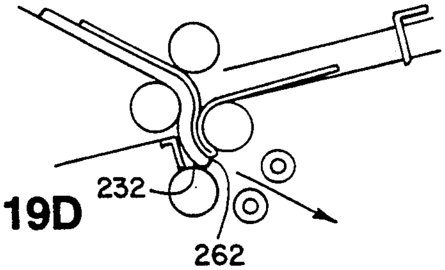
Fig. 19D
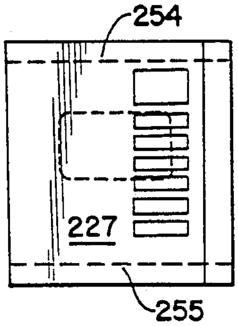
Fig. 18
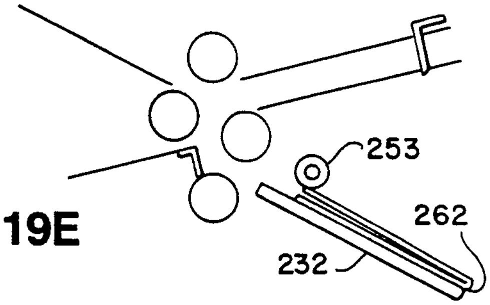
Fig. 19E

METHOD OF MAKING AND USING A COMBINED SHIPPING LABEL PRODUCT INFORMATION DEVICE

BACKGROUND AND SUMMARY OF INVENTION:

This invention relates to a method of making and using a combined shipping label and product information device and structure and, more particularly to a unitary structure in the nature of a shipping label which has product information such as invoicing on a hidden inner surface.

Conventionally, shippers provide a paste-on label and a separate packing list/invoice/product information sheet for placement in an envelope which can either be applied also to the exterior of the carton or placed inside of the carton. More importantly, the workers in the art having to do with labels, invoicing, business forms, etc. have not been able to provide a simple, easily made and used paper device that serves the function of both a shipping label and providing product information such as "picking". Picking is the term used for locating the product incident to shipping—as in a warehouse.

This is achieved through the instant invention which employs a relatively elongated foldable sheet means having a plurality of panels, the sheet means when originally unfolded, being printed on different panels to provide the addressee and product information separately after which the device, when folded, is secured to the exterior of a shipping carton.

Other advantages and objects of the invention may be seen in the details of the ensuing specification.

BRIEF DESCRIPTION OF DRAWING

FIG. 1 is a fragmentary top plan view of a carton equipped with a label and packing list according to the PRIOR ART;

FIG. 2 is a fragmentary perspective view of a partially opened zig-zag folded web featuring a plurality of the inventive devices arranged in over-under relation;

FIGS. 7A-7F are schematic views of equipment showing the device of FIG. 3 of various stages of conversion from an unfolded sheet to the folded label/invoice;

FIG. 8 is a perspective view of a partially unfolded device showing the bottom surface thereof including the longitudinally extending adhesive patterns and fold lines;

FIG. 9 is a view similar to FIG. 8 but showing the top surface of the partially unfolded device;

FIG. 10 is a top plan view of the folded, glued device in condition for application to a carton;

FIG. 11 is a view similar to FIG. 10 but of a modified form of device;

FIG. 12 is a perspective view showing removal of the release liner incident to the device being applied to a shipping carton;

FIG. 13 is a top plan view of the device as applied to a carton incident to shipping to the addressee;

FIG. 14 is a perspective view showing the addressee tearing off a portion of the top panel to reveal the invoice panel;

FIG. 15 is a perspective view of the portion of the device removed in FIG. 14 and unfolded to show both the addressee panel and invoicing panel;

FIG. 16 is a top plan view of the blank for a two-panel version of the inventive device showing one face of the device;

FIG. 17 is a bottom plan view of the two-panel blank of FIG. 16;

FIG. 18 is a plan view of the folded, glued two-panel device of the invention resulting from the blank of FIGS. 16 and 17; and;

FIGS. 19A-19E are schematic side elevational views of the steps performed in converting the two-panel blank of FIGS. 16-17 to the completed device of FIG. 18.

DETAILED DESCRIPTION

FIG. 1 represents the PRIOR ART. There a carton as at A was equipped with an outgoing label B and separately provided was a transparent plastic envelope C which was printed as at D with a legend referring to the enclosure which normally was a packing list E. There was always the problem of the packing list (or invoice) becoming misplaced or, even worse, the wrong product information indicia or sheet being associated with a given outgoing label. This has been avoided by the instant invention which will be first explained in conjunction with the method of making and using the same.

In the first illustration given and with reference now to FIG. 2, the numeral 20 designates generally a partially unfolded zig-zag folded web which includes a plurality of devices as at 21, 21*a*, 21*b*, 21*c*, etc. Transverse folds as at 22 are provided between each device 21, 21*a*, etc. Extending perpendicularly to the folds 22 are control punch margins as at 23 and 23*a* which feature line holes 24 for processing the web during manufacture and subsequent operation.

Figure 3:
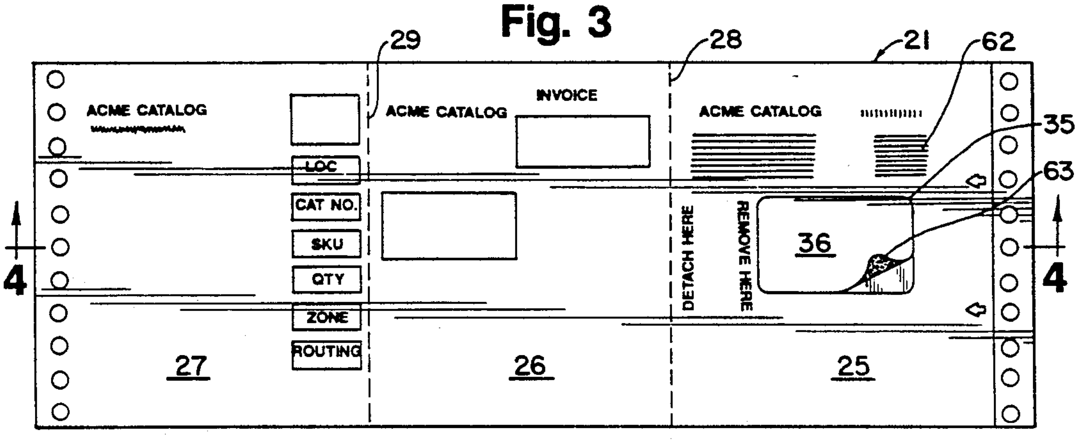
FIG. 3 is a top plan view of an individual device of the nature seen in FIG. 2.

A single device 21 is illustrated in FIG. 3 and it will be seen that this device includes three different panels 25, 26 and 27 (proceeding from right to left). The panels are separated by lines of perforation as at 28 between panels 25 and 26 and line 29 between panels 26 and 27.

While the devices 21, 21*a*, etc. are still in a continuous, connected form as illustrated in FIG. 2, the web embodying the same is advantageously stepped through a computer printer which applies variable information such as the addressee identification information to the panel 27 and invoicing information to the panel 26. The variable addressee identification information is designated 30 in FIG. 2 while the invoice information (also in FIG. 2) is designated 31.

After this variable information has been applied to the continuous web 20, the individual devices 21 are separated by bursting the web 20 along the fold lines 22 which may be advantageously perforated to facilitate bursting. Incident to bursting, the left control punch margin 23*a* (if present) is advantageously trimmed inasmuch as it is no longer needed for further processing. For that matter, the right hand control punch margin is not used in conventional fashion thereafter—as to engage pin belts or the like—but rather is part of a release liner 32 (see FIGS. 4 and 5).

Figure 4:
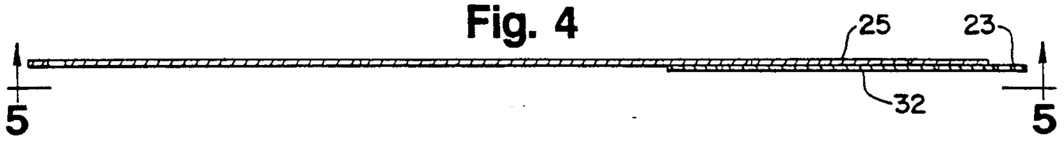
FIG. 4 is a sectional view such as would be seen along the sight line 4—4 applied to FIG. 3.

In FIG. 4 it will be noticed that the panel 25 has on its under surface the release liner 32 which overlaps the panel 25 slightly at the right to provide the right hand control punch margin 23. This also serves as a convenient gripping means for removal of the release liner from the panel 25 as can be readily seen from FIG. 12. The bottom surface of the paper sheet providing panel 25 is equipped with a pressure sensitive adhesive as at 33 (still referring to FIG. 12) and which is covered by the release liner 32.

Advantageously the release liner 32 is die-cut as at 34 (see FIG. 5) to provide a closed perimeter. Positioned within the closed perimeter is a die-cut 35 in the panel 25 which provides a patch 36 which is removable to provide a coupon or the like to be described hereinafter.

Figure 6:
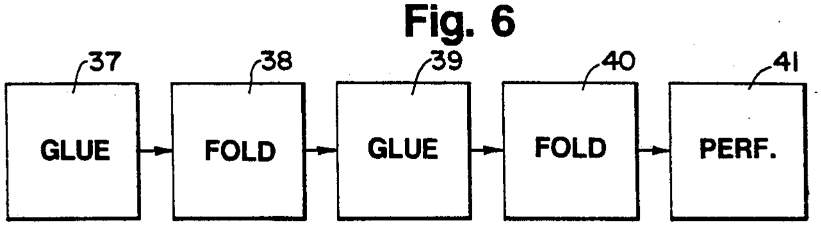
FIG. 6 is a schematic flow diagram showing the steps of processing of the device of FIGS. 3-5 in preparation for its use as a label/invoice.

Once the device 21 has been printed, trimmed and detached, it is ready for processing into the folded device for ready application to a shipping carton. The steps performed on the device are schematically represented in FIG. 6 and involve a first gluing step 37, a first folding step as at 38, a second gluing step as at 39, a second folding step as at 40, and finally a perforation step 41. These are also represented in sequence schematically in FIGS. 7A–7F to which reference is now made. Omitted from FIG. 6 are the steps of computer printing and mechanically or manually bursting. In fact, the bursting can be omitted when using a sheeted as contrasted to a fan-fold construction.

As mentioned previously, the left hand control punch margin is trimmed from the device 21 and this is illustrated schematically at 42 to provide a leading edge as at 43. The leading edge 43 is also designated in FIG. 8 and it is this leading edge 43 with the surface containing the release liner 32 positioned upwardly that is illustrated in FIGS. 7A and 7B.

The device 21 passes by glue-applying apparatus 44 which lays down longitudinally extending glue bands or patterns 37*a*. 37*b* (see FIG. 8). Here the term "longitudinally" refers to the direction of advance of the device 21 during gluing, folding, etc. It is different from the direction of advance during printing. As the device 21 proceeds further between draw rolls 45, 46, it enters into a buckle folder 47 which develops a first fold 38 (corresponding to the showing in FIG. 6).

Thereafter, the device 21 passes through the nip 48 defined by draw rolls 46 and 49 (see FIG. 7C) and enters a second buckle folder 50 (see FIG. 7D). At this time, the device 21 is generally in the form depicted in FIG. 9 in that the panel 26 is facing upwardly and equipped with a spaced dot pattern of adhesive as at 39 by virtue of the adhesive applying means 51.

Thereafter the now-twice folded device 21 passes between draw rolls 49 and 52 (see FIG. 7E) and thence through a perforator 53 (see FIG. 7F) to develop longitudinally extending lines of perforation as at 54 and 55 in the device 21 as seen in FIGS. 10 and 13. In FIG. 13, the device 21 is seen to be applied to a carton A and this is achieved by virtue of removing the release liner 32 as by performing the step indicated in FIG. 12. That the release liner 32 is missing can be appreciated from the fact there are no line holes showing in FIG. 13 as there were at 23 in FIG. 10.

Once the carton A has been received by the addressee, the step indicated in FIG. 14 is performed. Arrows at 54*a* and 55*a* serve as indicia for where tearing is to occur. If desired, additional instructional information can be applied such as a legend "LIFT HERE TO OPEN".

In FIG. 14, the portion of the device 21 between the perforation lines 54 and 55 is seen in the process of being torn out. This includes the panels 26 and 27 which are connected together but separated from the panel 25 by breaking the perforations in the line of perforations 28. This results in a two-panel piece as seen in FIG. 15. The invoice panel 26 can be detached from the addressee panel 27 by tearing along the perforation line 29.

SUMMARY OF OPERATION

The zig-zag folded web means is normally produced by a forms manufacturer. A continuous web is normally printed to provide the "fixed" information, i.e., the information that remains constant from one device 21 to another, viz., 21*a*, etc. This includes, for example, the so-called "pick" information boxes 56—see the upper left hand portion of FIG. 2. Conventionally, these are available for inscribing with the location of the goods to be shipped along with other information. The fixed information may also include the boxes 57 relating to invoicing or other product information and warranty or return information as at 58 and 59 in FIG. 5.

Further, the forms manufacturer can equip the web 20 with the release liner 32 either by having the release liner carry the adhesive or applying the adhesive to the bottom surface of the web 20 and adhering the silicone-coated release liner sheet thereto. Still further, the business forms manufacturer can punch the line holes 24 in one or more control punch margins and also introduce the lines of perforation as at 22, 28 and 29.

Alternatively, the release liner 32 and panel 25 can be provided separately and attached in the fashion seen in co-owned U.S. Pat. No. 4,865,669 or earlier similar constructions as seen in U.S. Pat. Nos. 4,696,843 , and 4,627,994.

In any event, the fan-folded stack of forms is transferred to the customer of the business forms manufacturer for use in connection with shipping cartons of merchandise to retail customers.

At the plant of the shipper, an order is processed by stepping the zig-zag folded form through a computer printer making use of the line holes 24 in at least the control punch margin 23. The computer printer supplies the variable information as at 30 and 31 and, if so programmed, can fill in the "pick" blanks 56. For example, these blanks may refer to the location of the merchandise within the warehouse, the catalog number, the quantity, the routing, etc.

Figure 5:
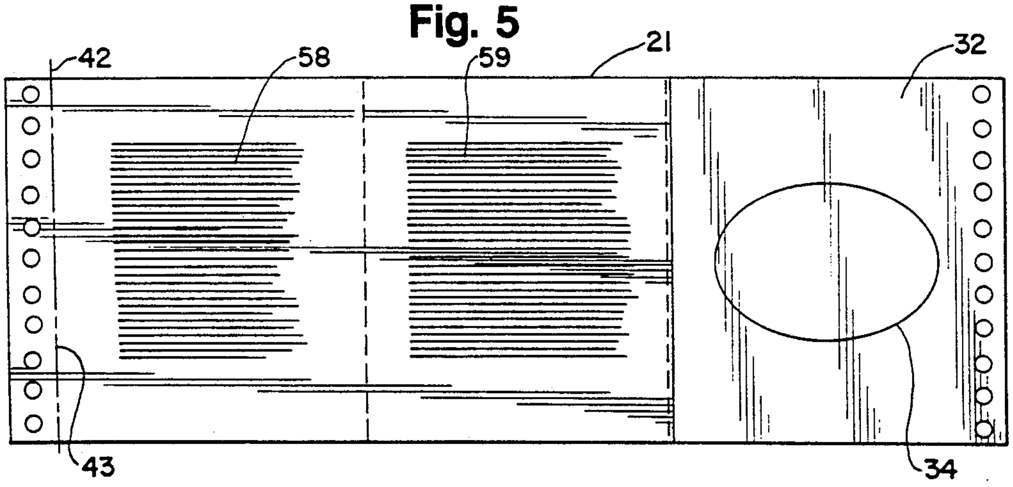
FIG. 5 is a bottom plan view such as would be seen along the sight line 5—5 applied to FIG. 4.

Thereafter, the zig-zag folded form is trimmed and burst so as to remove the control punch margin 23*a* along the line 42 of FIG. 5. Thereafter, the device 21 is subjected to the sequence of steps pictured in FIGS. 7A–7F wherein the device is equipped with glue both longitudinally and transversely and folded so as to achieve the form or device pictured in FIG. 10.

An advantageous variation is seen in FIG. 11 where the "pick" blanks 156 are provided on a detachable extension portion 160 provided as part of the addressee information panel 127. When the warehouse person applies the device 21 to the carton A as seen in FIGS. 12 and 13, the overlapping or extension portion 160 is easily detached along the line of perforation 161.

Upon receipt, the addressee performs the step illustrated in FIG. 14 to remove the panels 26 and 27. The panel 26 which can carry the invoice information is used to pay for the merchandise or it can be used as a means for returning the merchandise by virtue of carrying product information.

The panel 25 which remains on the carton can be used for returning the merchandise by virtue of carrying the shipper's information as at 62 in FIG. 3. Additionally, or alternatively, the panel 25 can carry a coupon as at 36 which may be employed for a variety of uses by the shipping retailer. The removal of the patch or coupon 36 carries with it the adhesive 63 (still referring to FIG. 3) so that the patch is easily applied to another sheet. By the same token, the removal of the coupon does not expose any adhesive on the release liner 32 so that the patch-less panel 25 can be used as a return label. Further details of instruction of the patch 3 and the die-cuts 34 and 35 which provide the same can be found in co-owned U.S. Pat. No. 4,995,642.

Two-Panel Embodiment

A smaller version is possible in the event the shipping retailer has available two-side printing capability. It will be appreciated that in the three-panel embodiment of FIGS. 2-15, a single-side printer is all that is required—for example, a desk top personal computer or other small portable printer can be employed. Where, however, two-side printing is possible, the embodiment of FIGS. 16-19 can be employed.

FIG. 16 illustrates the form or device 221 as it reaches the retailing shipper. The panel 225 has on its reverse side the release liner 232, part of which is the control punch margin as with a three panel document. As indicated a two panel document employed in our invention requires duplex printing (variable imaging on two sides of the same sheet). This is traditionally achieved by using a sheet fed laser printer. When this is the case, the line holes are unnecessary. For that matter, the projection 223 can be omitted but we retain it for a convenient means for detaching the liner 232.

The liner 232 is also seen at the left in FIG. 17. The panel 226 again carries the invoice or variable information relating to the product while the reverse side or surface providing the panel 227 is adapted to receive the addressee identification information. Also, the panel 227 (see FIG. 17) contains the "pick" boxes 256. The panel 226, 227 is separated from the panel 225 by fold line 262.

At the retailer-shipper's plant, the form or device 221 is advanced past a longitudinal gluer 244 much the same as was the case in FIG. 7A—see FIG. 17A. where the leading edge is designated 243. Thereafter, the continued advance of the device 221 (between draw rolls 245 and 246) introduces the leading edge 243 of the device 221 into the buckle folder 247. There, the leading edge is equipped with a transverse pattern of glue by means of a gluing device 251. The positions of the glue from gluers 244 and 251 are designated 244*a* and 251*a*, respectively, in FIG. 16.

The remainder of the operation is similar to that explained in conjunction with FIGS. 7A-7F except that only one transverse fold is developed and ultimately lines of perforation as at 254 and 255 are applied by the perforating means 253.

We claim:

1. A method of making and using a combined shipping label and product information device comprising the steps of:

providing at a first location a relatively elongated foldable sheet means having a pair of sides and including a connected series of devices, each said device including a plurality of connected panels between said sides, each said device when folded to place said panels in superposed relation having top and bottom outer surfaces and hidden inner surfaces, providing fixed information for application to each of said devices, printing at said first location each of said devices with said fixed information, providing an elongated release liner for application to said connected series of devices, adhering at said first location said release liner to said connected series of devices, transferring the release liner-equipped connected series of devices to a second location, providing variable addressee and product information for application to each of said devices, computer printing at said second location variable addressee identification information on one panel and variable product information on another panel of each said devices, separating said connected series of devices into individual devices with each device having its plurality of panels between said sides, orienting each device with a side thereof disposed forwardly in a longitudinally extending path at said second location so as to define for each device a leading edge disposed forwardly and a pair of side edges extending parallel to said longitudinally extending path, advancing at said second location the thus-printed devices serially along said longitudinally extending path with said leading edge foremost and applying adhesive in a longitudinally extending pattern adjacent each of said side edges and also in a transversely extending pattern while folding each said device between adjacent panels to position said product information on one of said hidden inner surfaces and said addressee identification information on said top outer surface, perforating each folded device along a longitudinally extending line adjacent each of said side edges inboard of said longitudinally extending adhesive pattern, removing said release liner and adhesively securing said bottom outer surface to a carton, shipping said carton to the addressee location identified on said top outer surface, and upon carton receipt and while said device is still adhesively secured to the carton tearing said device along said longitudinally extending lines to expose said product information on said hidden inner surface.

2. The method of claim 1 in which said steps include providing each of said devices with three panels arranged in side-by-side relation and when in unfolded condition having top and bottom surfaces, said top surface including said top outer surface and said one hidden inner surface, providing at said second location a single side printer and printing said addressee identification information and product information said top surface by advancing said sheet means through said single side printer.

3. The method of claim 2 in which said steps include providing each device in said first location with longitudinally spaced, transversely extending lines of perforation defining a first panel equipped with said release liner, a second panel and a third panel, printing said produce information on said second panel and said addressee identification information on said third panel, and applying said transversely extending pattern of adhesive for uniting the top surfaces of said first and second panels adjacent the transverse line of perforation defining said third and second panels.

4. The method of claim 3 in which said steps include applying said longitudinally extending patterns of adhesive to said bottom surface to unite said second and third panels.

5. The method of claim 1 in which said steps include providing each of said devices with two panels arranged in side-by-side relation, said panels each having top and bottom surfaces, said top surface including said top outer surface and said bottom outer surface, said bottom surface including said one hidden inner surface, and printing said addressee identification information on said top surface and said product information on said bottom surface.

6. The method of claim 5 in which said steps include providing each device in said first location with a longitudinally extending line of perforation defining said panels, a first of said panels being equipped with said release liner, a second of said panels being equipped with both said product information and said addressee identification information.

7. The method of claim 6 in which said steps include applying both patterns of adhesive to said bottom surface.

8. The method of claim 1 in which said steps include providing said connected series of devices with control punch margin means along at least one side of said release liner, advancing said web means in said first location along a path parallel to said side and through a printer to apply said addressee identification information and said product information, performing said step of providing said release liner including providing said release liner with an overlapping finger graspable part for detachment of said release lines.

9. The method of claim 1 in which said steps include providing said release liner with a closed perimeter die cut, also equipping said sheet means with a closed perimeter die cut located within said release liner die cut to define a removable patch whereby when said tearing step is performed said patch is exposed for removal from said sheet means, and removing said patch along with pressure sensitive adhesive.

* * * * *